(12) United States Patent
Eberhart

(10) Patent No.: US 7,650,146 B2
(45) Date of Patent: Jan. 19, 2010

(54) SYSTEM AND METHOD FOR MONITORING COMMUNICATION

(75) Inventor: Andreas Eberhart, Oberburg (CH)

(73) Assignee: Disetronic Licensing AG, Burgdorf (CH)

( * ) Notice: Subject to any disclaimer, the term of this patent is extended or adjusted under 35 U.S.C. 154(b) by 558 days.

(21) Appl. No.: 11/316,677

(22) Filed: Dec. 22, 2005

(65) Prior Publication Data

US 2006/0160491 A1 Jul. 20, 2006

Related U.S. Application Data

(63) Continuation of application No. PCT/EP2004/006845, filed on Jun. 24, 2004.

(30) Foreign Application Priority Data

Jul. 2, 2003 (DE) ................ 103 29 846

(51) Int. Cl.
*H04M 11/00* (2006.01)
*H04Q 7/20* (2006.01)

(52) U.S. Cl. ............... 455/421; 455/404.1; 455/420; 455/456.1; 600/309; 600/345; 600/365; 604/65; 604/67; 604/31

(58) Field of Classification Search ............... 455/421, 455/423, 424, 425, 67.11, 67.7, 404.1, 420, 455/456.1, 556.1, 156.1, 226.4; 600/309, 600/345–366; 604/65–67, 31, 522, 503, 604/504
See application file for complete search history.

(56) References Cited

U.S. PATENT DOCUMENTS 5,381,129 A    1/1995   Boardman

| 6,441,747 | B1 | 8/2002 | Khair et al. |
| 6,537,230 | B1 * | 3/2003 | Pfeiffer et al. ............ 600/526 |
| 6,747,555 | B2 * | 6/2004 | Fellenstein et al. .......... 340/524 |
| 7,025,743 | B2 * | 4/2006 | Mann et al. ................ 604/66 |
| 7,289,801 | B2 * | 10/2007 | Chan et al. ................ 455/421 |
| 2004/0242163 | A1 * | 12/2004 | Karr et al. .................. 455/73 |

FOREIGN PATENT DOCUMENTS

| DE | 38 37 734 C2 | 4/1995 |
| DE | 695 08 664 T2 | 10/1999 |
| DE | 19941580 | 3/2001 |
| DE | 699 06 388 T2 | 2/2004 |
| GB | 2 377 776 A | 1/2003 |
| WO | WO 01/22379 A1 | 3/2001 |
| WO | WO 01/32261 A1 | 5/2001 |
| WO | WO 02/086837 A1 | 10/2002 |

\* cited by examiner

*Primary Examiner*—Tuan A Pham
(74) *Attorney, Agent, or Firm*—Dorsey & Whitney LLP

(57) ABSTRACT

A system including at least two distally separated devices that are in wireless communication with each other, wherein at least one of the two devices is provided with a warning mechanism configured to indicate an existing or imminent interruption or disturbance of communication. The inventive system may include a base unit and at least one mobile medical or pharmaceutical device in unidirectional communication or bidirectional communication with the base unit. A method for monitoring wireless communication between at least two devices is encompassed, wherein at least one of the two devices indicates an existing or imminent interruption or disturbance of the wireless communication by changing a type of the communication signal transmission.

23 Claims, 1 Drawing Sheet

SYSTEM AND METHOD FOR MONITORING COMMUNICATION

CROSS-REFERENCE TO RELATED APPLICATIONS

This application is a continuation of International Application No. PCT/EP2004/006845, filed on Jun. 24, 2004, which claims priority to German Application No. 103 29 846.0, filed on Jul. 2, 2003, the contents of both applications are hereby incorporated by reference in their entirety.

BACKGROUND

The present invention relates to a system comprising at least two devices in wireless communication with each other and to a method for monitoring the communication between the at least two devices. In particular, the invention relates to a system comprising a base device and at least one remote device. The remote device may be a medical or pharmaceutical device, such as an infusion, injection or inhalation device.

A variety of applications for devices that wirelessly communicate with each other are known, such as the field of mobile communications and personal identification. In existing wireless communication systems, one of the devices typically comprises a stationary base device, which has a transmitting and receiving unit. A further device is typically mobile and may easily be carried by a user. The mobile device may likewise comprise a transmitting and receiving unit or just a transmitting unit or a receiving unit. When the mobile device is switched on and wireless communication with the base device established, the base device identifies the network address of the mobile device and the mobile device receives an indication that communication between the base device and the mobile device is successfully established and that the mobile device is ready for use.

In the case of a stationary base device and a mobile device, when the mobile device comes into sufficient proximity with the base device, the two devices enter into wireless communication with each other as soon as the distance between the devices is less than a maximum operational distance. When communication between the two devices is established, the mobile device is identified by the base device and an indication is transmitted by the base device to indicate whether identification has been successful or unsuccessful.

In the case of wireless communication performed by mobile phones, the quality of the reception of a signal from a base station is customarily indicated on a display on the mobile phone as a bar diagram. However, no warning is given if the reception of the signal is no longer sufficient to ensure communication between the mobile phone and the base station.

However, it is desirable to detect and anticipate an interruption or disturbance of the wireless communication between devices before the interruption or disturbance occurs, which would avoid instances of damage and delays in sequences that are monitored by the device system, such as manufacturing processes. In the case of medical or pharmaceutical applications of wireless communications, timely warning of an anticipated loss of communication between two devices that communicate with each other would allow for proactively avoiding the anticipated interruption thereby allowing for treatment procedures to be safely carried out and for continuous care of a patient.

SUMMARY

The present invention provides a system of at least two devices in wireless communication with each other that warns of imminent inadequate communication, ensures continuous communication, avoids transmission errors between the devices, and facilitates monitoring of the communication. The present invention provides a method for monitoring the communication of wireless devices, which allows verifying the wireless communication signal thereby facilitating the prevention of undesired interruptions or disturbances of the communication signal. At least one of the two devices is provided with a warning mechanism configured to indicate an existing or imminent interruption or disturbance of communication. The inventive system may include a base unit and at least one mobile medical or pharmaceutical device. The base unit and the at least one medical or pharmaceutical mobile device may be in unidirectional communication or bidirectional communication.

DETAILED DESCRIPTION OF THE INVENTION

Figure 1:
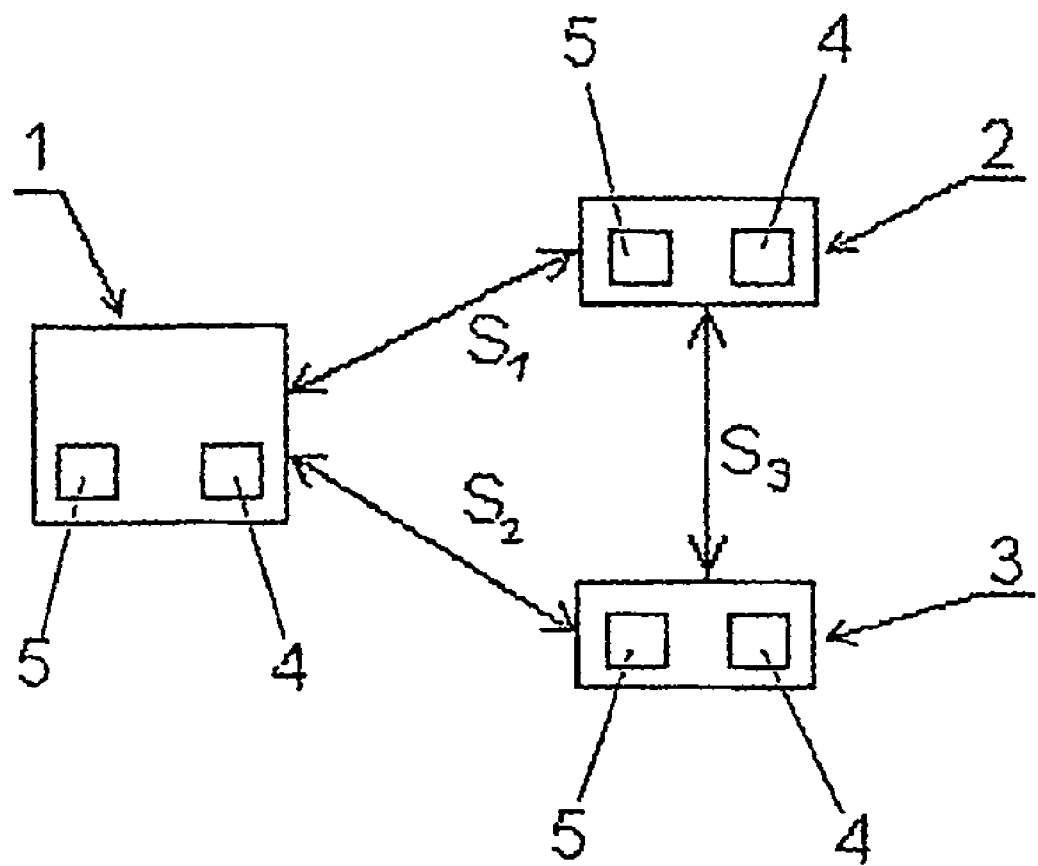
FIG. 1 is a representational view of a system comprising three devices in wireless communication with one another according to an embodiment of the present invention.

With regard to fastening, mounting, attaching or connecting components of devices of the present invention, unless specifically described as otherwise, conventional fasteners such as screws, rivets, toggles, pins and the like may be used. Other fastening or attachment means appropriate for connecting components include friction fitting, adhesives, welding and soldering, the latter particularly with regard to electrical or processing components or systems. Any suitable mechanical or power communicating links, linkages or transmission may be used. Any suitable electronic, electrical, communication, computer or processing components may be used, including any suitable electrical components and circuitry, wires, wireless components, sensors, chips, boards, microprocessing or control system components, software, firmware, hardware, etc.

Represented in FIG. 1 is a first device 1, which forms a stationary base device. A mobile device 2 is in wireless communication with the base device I by means of a communication signal $S_1$. A further mobile device 3 is likewise in wireless communication with the base device 1 by means of a communication signal $S_2$. Mobile device 2 and the mobile device 3 are in wireless communication with each other by means of a communication signal $S_3$. With the devices 1, 2, and 3 are in wireless communication with each other across a certain distance, i.e. there is no physical connection between the devices. Arranged in at least one of the devices 1, 2 and 3 is a warning device 5, which provides a warning if there is an existing or imminent interruption or disturbance of the communication signals. Additionally, the devices 1, 2, and 3 include a communication unit 4.

In one embodiment, each device of the system is equipped with a warning device. In this case, the communication unit 4 of one or more of devices 1, 2, or 3 is a transmitting unit. Alternatively, the communication unit 4 of one or more of the devices is a transmitting and receiving unit and the communication unit 4 of any of the other devices is a receiving unit or a transmitting and receiving unit. The selection of a transmitting and/or receiving unit for a the communication unit 4 of a device depends on whether unidirectional or bidirectional communication between the devices is desired. Bidirectional communication allows of wireless communication monitoring at both the base device 1 and either of the mobile devices 2 or 3. The wireless communication between devices 1, 2, and 3 is achieved through a communication signal that is sent from a transmitting unit of a first device to a receiving unit of a second device and by a communication signal that is sent from the second device back to the first device.

In operation, a warning device 5 of one of the devices provides a warning through any of a variety of manners—such as an optical or acoustic warning—when, for example, there is a change, attenuation, interruption or disturbance of the communication signal between the devices. As a result, a user can take preventative steps to avoid a communication interruption or disturbance before it occurs. Such preventative steps may include actions such as reducing the distance between the devices or reducing an interfering signal that may be causing the disturbance. Continuous communication, and consequently regular data transmission, may thereby be provided.

The communication signals may take a variety of forms, such as radio-frequency signals and inductive signals. Inductive signals allow for energy-saving applications. A data transmission signal that is transmitted between two devices may be used to create the wireless communication between the two devices, or, alternatively, a signal that serves exclusively for communication monitoring may be used to create the wireless communication between the two devices.

In accordance with the method of the present invention for monitoring wireless communication over a predetermined distance between at least two devices, the at least two devices are in wireless communication connection through a communication signal. When an existing or imminent interruption or disturbance of the communication is identified, the warning is indicated by the warning device 5 of at least one of the devices or the type of signal transmission is changed. In one embodiment, the warning is generated if a predetermined maximum distance between two communicating devices is exceeded. The distance between the devices can be determined by the communication signal. The maximum distance may be determined based on the distance over which reliable communication between the devices can be ensured. This maximum distance may be manually set to account for different environments and ambient conditions.

A warning is indicated by a warning device 5 if a receiver unit of a device registers a change, attenuation, interruption or disturbance of the communication signal sent by the other device. In one embodiment, all the signal characteristics of the communication signal are stored in a memory in one of the devices as properties of a desired signal, i.e. the signal formation as it exists in the case of proper and satisfactory communication. A current signal sent by the transmitting unit is then compared with the desired signal, for example by a microprocessor in one of the devices. If the characteristics of the current signal unacceptably deviate from the characteristics of the desired signal, a change or disturbance of the communication signal between the two devices exists and a warning is given by a warning device 5. In this case, a minimum value of the deviation for individual characteristics may be predetermined, to create a warning only under appropriate conditions and not to generate a warning unnecessarily in the event of minor disturbances of the signal. The comparison between a current signal and a desired signal may also be performed only on the basis of specific selected signal characteristics or only on the basis of a single signal characteristic. The signal level or the signal amplitude may be used for this purpose. Alternatively, the signal-to-noise ratio may also be used to perform the comparison. In yet another alternative, the comparison may be performed on encrypted information carried in the signal by processing a method of comparison, such as a checksum method. If any of the aforementioned comparisons yield a result outside the acceptable range, a warning is generated to indicate an incorrect transmission.

The communication signal may be formed by periodically emitted signal sequences. Signal sequences of such a partly regular transmission are also known in computer technology as "ping" signals with a "pong" response (RCP/IP). If a response signal is expected in response to a transmitted signal, testing for signal sequences or signal frequencies allow detection of a disturbance in the communication of the communicating devices that is independent of other devices. Checksum methods, which check the signals for completeness and correctness, are suitable for example for this purpose. On the basis of a converse response ("pong"), complete communication may be verified. If there is no response, a warning may be instigated, or alternatively, repetition of the "ping" sequence may be performed until, after a fixed number of communication attempts, a warning is generated. The length of a period of the partly regular transmission, i.e. the interval between the individual signal sequences, can be manually set. The length of the period may be any desirable duration, such as a few tenths of a second or a few minutes. The processing of the communication signal, or the comparison of the current signal and the desired signal, may be performed by a microprocessor in any of devices 1, 2, or 3. The microprocessor may also emit a signal for providing the warning to a warning device 5 in one of the devices or in all of them. Therefore, it is not necessary to carry out the signal processing or the signal comparison in each of the devices in order to produce a warning in each device.

As described, in one embodiment, a warning is generated to indicate a signal disturbance. Alternatively, a signal disturbance may be indicated by changing characteristics of the signal transmission, such as the signal frequency, if a malfunction is imminent or has been established. Furthermore, if a non-optimized network is used for the wireless communication, the level of utilization can be determined on the basis of the monitoring of the communication of the devices. If reliable communication is not possible due to a high level of utilization, a warning can also be provided.

Instances of damage and failure caused by faulty functioning of the devices may be also avoided or reduced by the system and method of the present invention when a timely response can be made to a communication disturbance or interruption. In an embodiment of the present invention, the system and method described herein may be used to reliably monitor of the communication between medical or pharmaceutical device systems. Such a system may comprises a base device with a transmitting and receiving unit and at least one medical or pharmaceutical device with a transmitting unit, a receiving unit or a transmitting and receiving unit. Such a medical or pharmaceutical device may be an infusion, injection, or inhalation device for administering a medical or pharmaceutical product or else a measuring device for measuring various body parameters, such as for example the blood sugar.

An infusion, injection, or inhalation device or a measuring device may be provided as a mobile device which the user carries with him and which is in wireless communication with a base device. Multiple mobile devices may also be in wireless communication with each other, which may be desirable, for example, for infusion devices for insulin and blood sugar measuring devices. Reliable transmission of data and instructions that are necessary for medical or pharmaceutical treatment is ensured in accordance the foregoing description. Furthermore, the system and method described herein provides the user a manner of verifying if he or she has forgotten a device. The warning allows a decision to be made on whether or not it is necessary to carry the device.

In one embodiment, mobile device 2 is an insulin pump and the mobile device 3 is a blood sugar measuring device. The base device 1 is a control device that registers and controls both the function of the insulin pump 2 and the function of the blood sugar measuring device 3. Each of the devices 1, 2 and 3 has a transmitting and receiving unit 4, with which the signals $S_1$, $S_2$ and $S_3$ can be sent to the other devices or received by them. Therefore, bidirectional communication is provided between the individual devices. Warning device 5 gives a warning if there is an existing or imminent interruption or disturbance of the communication signals. A maximum permissible distance between the individual devices, the exceeding of which has the effect that the transmission of a communication signal can no longer be ensured, can be set differently for the different devices. Furthermore, the length of a period for the periodically emitted signal sequences of a communication signal can be set differently for the different communication signals $S_1$, $S_2$ and $S_3$ between the respective devices.

The invention has been presented on the basis of a system for supplying a patient with insulin that has three devices. However, it is clear that the system can be supplemented by further devices. Furthermore, the system according to the invention and the method can be used in many other technical areas. Moreover, the present invention has been described with reference to three devices, 1, 2, and 3, but any reasonable number of devices in wireless communication may be configured to practice the teachings of the present invention.

Embodiments of the present invention, including preferred embodiments, have been presented for the purpose of illustration and description. They are not intended to be exhaustive or to limit the invention to the precise forms and steps disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A communication system comprising:
a base device comprising a transmitting and receiving unit;
at least one device remote from the base device that is in wireless communication with the base device, wherein one of the at least one device comprises a medical or pharmaceutical device, and wherein the base device registers and controls the function of the medical or pharmaceutical device related to the administration of a medicinal fluid from the medical or pharmaceutical device in response to signals received from one or more of the at least one device; and
a warning device provided in at least one of the base device and medical or pharmaceutical device, wherein the warning device comprises an optical or acoustic alarm, and wherein the warning device indicates an existing or imminent interruption or disturbance of the wireless communication between the base device and one or more of the at least one device by activation of the optical or acoustic alarm.

2. The communication system as claimed in claim 1, wherein the base device comprises a transmitting unit and the at least one device comprises a receiving unit, and wherein the base device is in wireless communication with the at least one device through a communication signal emitted by the transmitting unit and received by the receiving unit.

3. The system as claimed in claim 2, wherein the wireless communication between the base device and the at least one device is unidirectional.

4. The communication system as claimed in claim 2, wherein each of the at least one device comprises a transmitting and receiving unit.

5. The system as claimed in claim 4, wherein the wireless communication between the base device and the at least one device is bidirectional.

6. The system as claimed in claim 4, wherein the base device receives a defined response signal, wherein the defined response signal is responsive to receipt of the communication signal.

7. The system as claimed in claim 2, wherein the communication signal is formed by periodically emitted signal sequences.

8. The system as claimed in claim 7, wherein the signal sequences are emitted at a predetermined interval.

9. The system as claimed in claim 2, wherein the communication signal includes encrypted information.

10. The system as claimed in claim 2, wherein the communication signal is an inductive signal.

11. The system as claimed in claim 2, wherein the communication signal is a radio-frequency signal.

12. The system as claimed in claim 1, wherein the medical or pharmaceutical device is an infusion device, an injection device, or an inhalation device.

13. A method for monitoring wireless communication over a predetermined distance between a base device comprising a transmitting and receiving unit and at least one device, wherein one of the at least one device comprises a medical or pharmaceutical device, wherein the base device is in wireless communication with the medical or pharmaceutical device through a communication signal, wherein the base device controls a function of the medical device related to the administration of a medicinal fluid from the medical or pharmaceutical device in response to signals received from one or more of the at least one device, and wherein the medical or pharmaceutical device indicates an existing or imminent interruption or disturbance of the wireless communication by activating an optical or acoustic alarm in the medical or pharmaceutical device.

14. The method as claimed in claim 13, wherein the interruption or disturbance is indicated if the predetermined distance between the base device and the at least one device is exceeded.

15. The method as claimed in claim 13, wherein the interruption or disturbance is indicated if the base device or the at least one device registers a change, attenuation, interruption, or disturbance of the communication signal.

16. The method as claimed in claim 13, wherein the communication signal is formed by periodically emitted signal sequences.

17. The method as claimed in claim 16, wherein the signal sequences are emitted at a predetermined interval.

18. The method as claimed in claim 13, wherein the medical or pharmaceutical device is an infusion device, an injection device, or an inhalation device.

19. The method as claimed in claim 13, wherein another of the at least one device comprises a medical or pharmaceutical device in wireless communication connection with the other medical or pharmaceutical device through a second communication signal.

20. The system as claimed in claim 1, wherein another of the at least one device comprises a measuring device, and wherein the base device receives signals from a the measuring device and transmits control signals to the medical or pharmaceutical device in response to the received measuring device signals.

21. The system as claimed in claim 20, wherein the warning device indicates the existing or imminent interruption or disturbance of the wireless communication upon detecting a maximum permissible distance between two or more of the base device, medical or pharmaceutical device and measuring device.

22. The system as claimed in claim 21, wherein a maximum permissible distance between the base device and the medical or pharmaceutical device is different from a maximum permissible distance between the medical or pharmaceutical device and the measuring device.

23. A communication system comprising:

a base device;

a medical device remote from the base device that is in wireless communication with the base device;

a measuring device remote from the base device and the medical device that is in wireless communication with the base device and the medical device; and a warning device provided in each of the medical device and the measuring device, wherein the warning device indicates an existing or imminent interruption or disturbance of the wireless communication between the base device and the medical device or the measuring device, wherein the warning device comprises an optical or acoustic alarm;

wherein the base device registers and controls the function of the medical device related to the administration of a medicinal fluid from the medical or pharmaceutical device in response to signals received from the measuring device.

* * * * *

UNITED STATES PATENT AND TRADEMARK OFFICE
CERTIFICATE OF CORRECTION

| | | |
|---|---|---|
| PATENT NO. | : 7,650,146 B2 | Page 1 of 1 |
| APPLICATION NO. | : 11/316677 | |
| DATED | : January 19, 2010 | |
| INVENTOR(S) | : Andreas Eberhart | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Twenty-eighth Day of December, 2010

David J. Kappos
*Director of the United States Patent and Trademark Office*